United States Patent [19]

Mizusawa et al.

[11] Patent Number: 4,677,448

[45] Date of Patent: Jun. 30, 1987

[54] RECORDING APPARATUS WITH A CARRIAGE-MOUNTED INK TANK AND OVERFLOW TANK

[75] Inventors: Nobutoshi Mizusawa, Yokohama; Noboru Koumura, Narashino, both of Japan

[73] Assignee: Canon Kabushiki Kaisha, Tokyo, Japan

[21] Appl. No.: 888,286

[22] Filed: Jul. 24, 1986

Related U.S. Application Data

[63] Continuation of Ser. No. 704,142, Feb. 21, 1985, abandoned, which is a continuation of Ser. No. 491,818, May 5, 1983, abandoned.

[30] Foreign Application Priority Data

May 11, 1982 [JP] Japan ................................. 57-77427

[51] Int. Cl.$^4$ ............................................ G01D 15/16

[52] U.S. Cl. ................................................ 346/140 R

[58] Field of Search ........................................ 346/140

[56] References Cited

U.S. PATENT DOCUMENTS

| | | | |
|---|---|---|---|
| 3,185,998 | 5/1965 | Bussey | 346/140 |
| 3,930,258 | 12/1975 | Dick | 346/75 |
| 3,967,286 | 6/1976 | Andersson | 346/140 |
| 4,178,595 | 12/1979 | Jinnai | 346/140 |
| 4,187,511 | 2/1980 | Robinson | 346/75 |
| 4,282,536 | 8/1981 | Paschen | 346/140 |

*Primary Examiner*—Joseph W. Hartary

*Attorney, Agent, or Firm*—Fitzpatrick, Cella, Harper & Scinto

[57] ABSTRACT

A recording apparatus comprising a first ink tank mounted on a carriage, a second ink tank which remains disconnected from the first tank during recording, means for intermittently forming an ink supply path extending between the first and second ink tanks when ink is to be supplied to the first tank from the second tank, and means for maintaining constant the amount of ink within the first ink tank.

27 Claims, 9 Drawing Figures

RECORDING APPARATUS WITH A CARRIAGE-MOUNTED INK TANK AND OVERFLOW TANK

This application is a continuation of application Ser. No. 704,172 filed Feb. 21, 1985 now abandoned, which in turn is a continuation of U.S. Ser. No. 491,818, filed May 5, 1983, now abandoned.

BACKGROUND OF THE INVENTION

1. Field of the Invention

The present invention relates to a recording apparatus such as ink jet printer and more specifically the present invention is directed to improvements in the ink supply system used in such recording apparatus.

2. Description of the Prior Art

Conventional recording apparatus generally includes a carriage having recording element(s) mounted thereon. To effect printing the carriage is driven on a recording paper in a scanning movement while supplying ink to the recording element(s) on the moving carriage. The method generally used for supplying ink to the recording element(s) is to use a flexible ink supply tube which is connected to the recording element(s) when printing is carried out. Through the flexible ink supply tube, ink is supplied to the recording element or elements from a stationary ink tank.

FIG. 1 shows an ink jet printer in which the above-mentioned ink supply method is employed.

In FIG. 1, reference numeral 1 denotes a recording paper, 2 is a paper feed roller by which the recording paper 1 is fed in the direction of arrow Y (secondary scanning direction), and 3 is a stepping pulse motor for driving the paper feed roller 2. 4 is a paper guide roller and 5 is a paper guide roller serving to form a printing plane. Designated by 6 is a multi-nozzle ink jet head disposed opposed to the recording paper 1 and running in parallel to the paper 1. 7 is a carriage on which the ink jet head is mounted. The carriage is reciprocally movable in the directions of arrow L and arrow R. The carriage 7 is driven running by a carriage driving stepping motor 8 through a timing belt 9. 10 is a slide shaft for guiding the carriage 7. The position of the carriage 7 is detected by carriage position sensors 11 and 12. 13 is a flexible circuit board for applying driving signals to the ink jet head 6. 14 is an ink supply tube for supplying ink to the ink jet head 6. The ink supply tube is a flexible tube one end of which is connected to an ink tank 15 and the other end to the ink jet head 6.

With the ink jet printer having the abovedescribed structure, printing is performed in the following manner:

For printing the carriage 7, together with the ink jet head 6 mounted thereon, is driven into reciprocal running by the stepping motor 8. In synchronism with the running of the head 6 on the recording paper 1, driving signals are applied to the individual nozzles of the head 6 through the flexible circuit board 13. In accordance with the applied signals, ink droplets are jetted from the nozzles toward the recording paper 1 to form an image on the paper. During the operation, ink is constantly being supplied to the head 6 from the ink tank 15 through the ink supply tube 14.

Since the ink supply from the tank 15 to the head 6 is continuously made through the flexible tube 14 during the running of the head 6, the flexible ink supply tube 14 also moves following the running of the carriage 7 during printing. Therefore, for this type of ink jet printer it is required to reserve a sufficiently large space enough to allow the flexible tube 14 to move without any trouble. However, since the ink supply tube 14 is flexible, its moving course is not fixed but variable case by case. Because of this, a large space must be reserved for the moving flexible tube 14. This large space occupied by the movement of the flexible ink supply tube 14 has prevented the construction of smaller printers. In addition, the unstable movement of the flexible ink supply tube has brought about various other problems in this type of printer. For example, the running load on the carriage 7 and the ink supply pressure to the head 6 are often varied due to the unstable movement of the flexible ink supply tube. These variations in running load and ink supply pressure in turn produce the problems of entrance of air into the head 6 from the individual nozzles and frequent change in flying course of the jetted ink droplets. All of these troubles will reduce the quality of images formed on the recording paper 1.

As a solution to the above problem it has already been proposed to use two ink tanks, the first one of which having a smaller ink capacity (it will hereinafter be referred to as sub-tank) and the second one having a larger capacity (referred to as main tank). Only the sub-tank is mounted on the moving carriage and the main tank is fixed in the main body of a printer. In printing, the sub-tank and the main tank are disconnected from each other. During only non-printing periods of time, they are connected into communication to supply ink. Such an ink supply system has been disclosed in U.S. Pat. No. 3,967,286 specification, and has been admitted to be very effective to eliminate the above-noted disadvantages of the conventional ink jet printer. However, the apparatus proposed by the aforementioned patent has the following drawbacks:

In the sub-tank there is used a liquid absorber such as cellular plastics or foam rubber to store ink in the sub-tank. Therefore, a relatively long time is required to supply ink from the main tank to the sub-tank. Furthermore, the amount of ink which can be contained in the sub-tank is limited considering the volume of the tank. If the liquid absorber is replaced with an ink pump to eliminate the disadvantage, then the problem of overflow of the supplied ink from the ink jet head when the supply is too great may occur.

The sub-tank is formed with an opening for ink feed. Because of the opening, the ink within the sub-tank is easily affected by the atmospheric pressure which causes a change of liquid level within the tank. With the change of the liquid level, the ink pressure in the individual nozzles also varies, which will result in change in amount and speed of the ink jetted from the nozzles. To prevent these troubles it is absolutely necessary to keep the liquid level within the sub-tank constant.

SUMMARY OF THE INVENTION

Accordingly it is the general object of the present invention to further improve the ink jet printing system proposed by the aforementioned prior invention (U.S. Pat. No. 3,967,286).

More specifically it is an object of the invention to provide a recording apparatus in which the liquid level within the sub-tank mounted on a carriage can be kept constant and also the ink supply pressure to the recording element can be kept constant.

It is another object of the invention to provide a recording apparatus in which the amount of ink in the sub-tank at ink supply time can be maintained at a constant value without need of any particular detection means for detecting the amount of ink and also to prevent leaking of ink from the recording elements.

It is a further object of the invention to provide a recording apparatus in which the liquid level within the sub-tank can be maintained constant by operating the system for ink supply and the system for withdrawing the over-flowed ink by ink supply at the same time.

A recording apparatus using recording liquid according to the present invention comprises a recording element for implementing recording on a recording medium; a first tank for storing the recording liquid to be supplied to the recording element; a carriage carrying thereon the recording element and the first tank; a second tank for storing the recording liquid to be supplied to the first tank; means for intermittently forming a supply path extending from the second tank to the first tank; and means for setting the liquid level of recording liquid within the first tank to a predetermined level.

Other and further objects, features and advantages of the invention will appear more fully from the following description taken in connection with the accompanying drawings.

DESCRIPTION OF THE PREFERRED EMBODIMENTS

Figure 1:
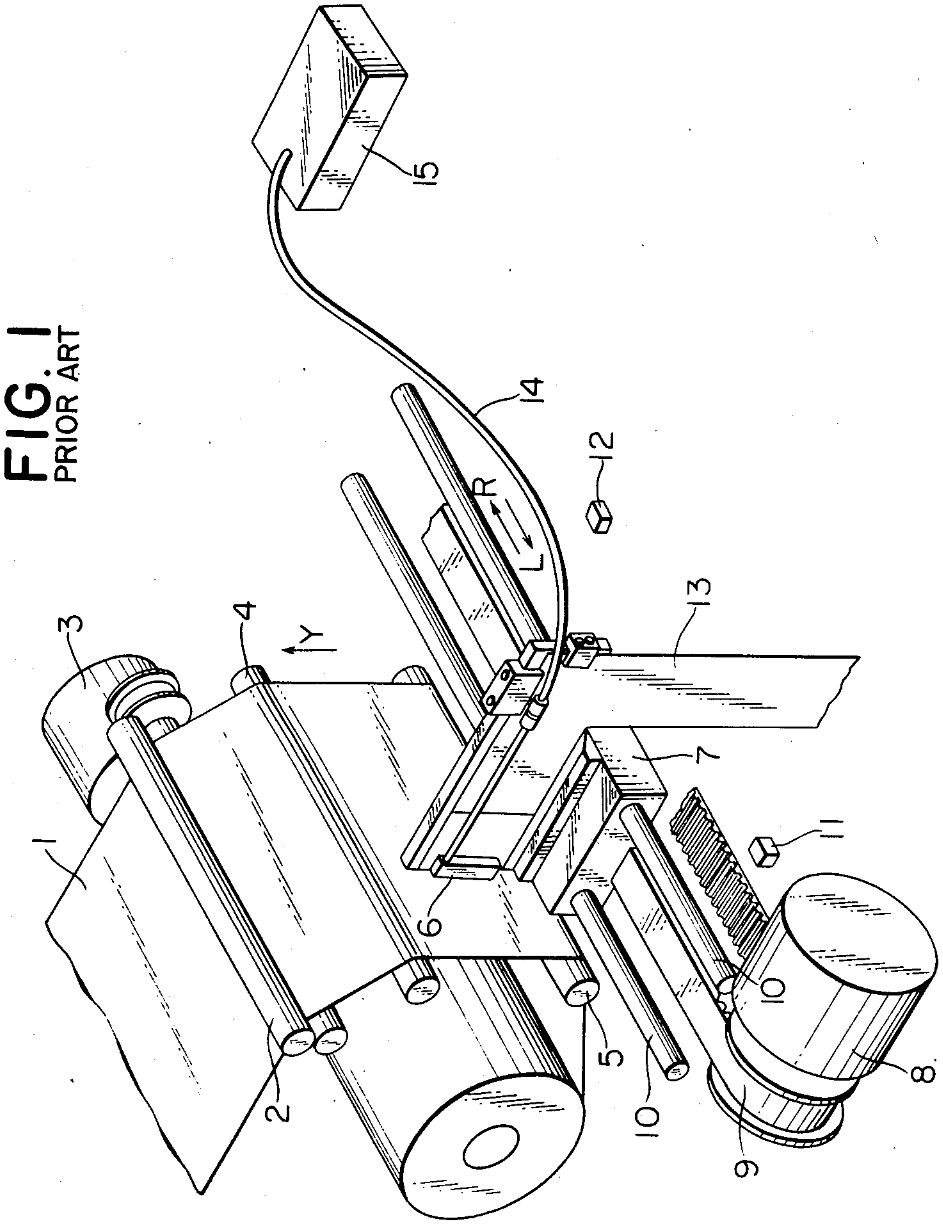
FIG. 1 PRIOR ART
FIG. 1 is a perspective view of a conventional recording apparatus.
Figure 2:
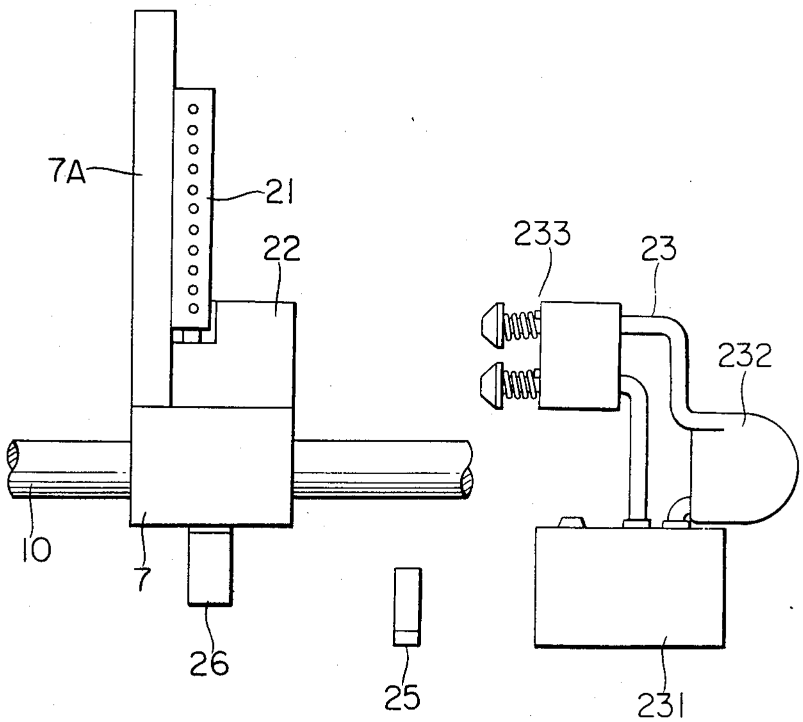
FIG. 2 shows an arrangement of the ink supply system as an embodiment of the invention.
Figure 3:
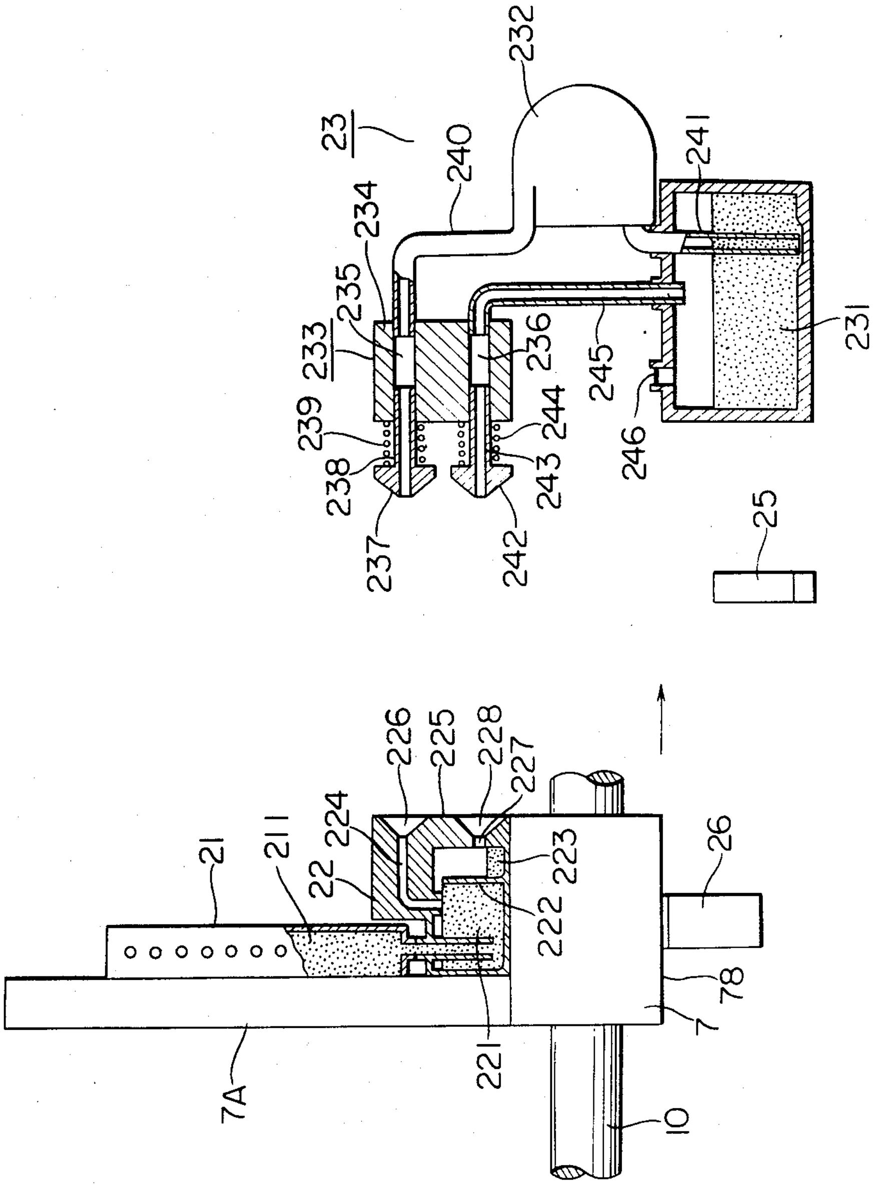
FIG. 3 is a partly enlarged sectional view of the ink supply system shown in FIG. 2.

FIGS. 2 and 3 show an embodiment of the invention wherein the present invention has been applied to an ink jet printer as shown in FIG. 1. The overall construction of the printer is the same as that shown in FIG. 1, and therefore FIGS. 2 and 3 show only the essential part of the invention, that is, the ink supply system.

Referring to FIG. 2, a multi-nozzle ink jet head 21 is fixedly mounted on a head base plate 7A of the carriage 7. 22 is a sub-tank also mounted on the carriage 7. 23 is an ink supply part fixed at a position in the vicinity of one end of the running path of the carriage 7. As later described in detail, ink is supplied to the sub-tank 22 from the ink supply part 23 during a determined period of time.

Detailed structure of every part of the above shown ink supply system will be described with reference to FIG. 3.

The individual nozzles of the head 21 are in communication to a liquid chamber 211 which is in turn in communication to an ink reservoir compartment 221 in the sub-tank 22. The sub-tank 22 includes also an overflow tank compartment 223 separated from the ink reservoir compartment by a partition wall 222. The height of the partition wall 222 is suitably selected to keep the liquid level of the ink within the reservoir compartment at a desired level thereby keeping the ink supply pressure to every nozzle constant. The ink flowed over from the reservoir compartment 221 is recovered into the overflow compartment 223.

Designated by 224 is an ink supply channel one end of which is in communication to the ink reservoir compartment 221 and the other end is led out into the atmosphere through a cone-shaped concaved portion 226. The concaved portion 226 is formed in the side wall 225 of the sub-tank and serves as an ink supply port. The overflow tank compartment 223 also has an ink withdrawal channel 227 formed in its side wall. At the other end, the ink recovery channel 227 is in communication with the atmosphere through a concaved portion 228 which serves as an ink withdrawal port. Like the ink supply port 226, the ink withdrawal port 228 is generally in the form of a cone and formed in the same side wall 225.

On the other hand, the ink supply part 23 includes a main tank 231 containing ink therein, a pump 232 and a nozzle section 233. The nozzle section 233 includes a supporting block 234 having an ink supply channel 235 and an ink withdrawal channel 236. Slidably inserted into the ink supply channel 235 is an ink supply tube 238 having a cone-shaped ink supply nozzle 237 at its forward end. As seen best in FIG. 3, a spring 239 is disposed between the nozzle 237 and the supporting block 234. The rear end of the channel 235 is connected to the exhaust port of the pump 232 through a supply tube 240. The suction port of the pump 232 is in communication to the interior of the main tank 231 through a suction tube 241. When the pump is driven, it sucks the ink from the main tank 231 through the suction tube 241 and sends the ink to the nozzle 237 through the supply tube 240. Similarly to the above, an ink withdrawal tube 243 is slidably inserted into the ink withdrawal channel 236. The tube 243 also has a cone-shaped ink withdrawal nozzle 242. A spring 244 is disposed between the nozzle 242 and the supporting block 234. The rear end of the channel 236 is in communication to the main tank 231 through an ink withdrawal tube 245. The main tank 231 has an air hole 246.

Figure 4:
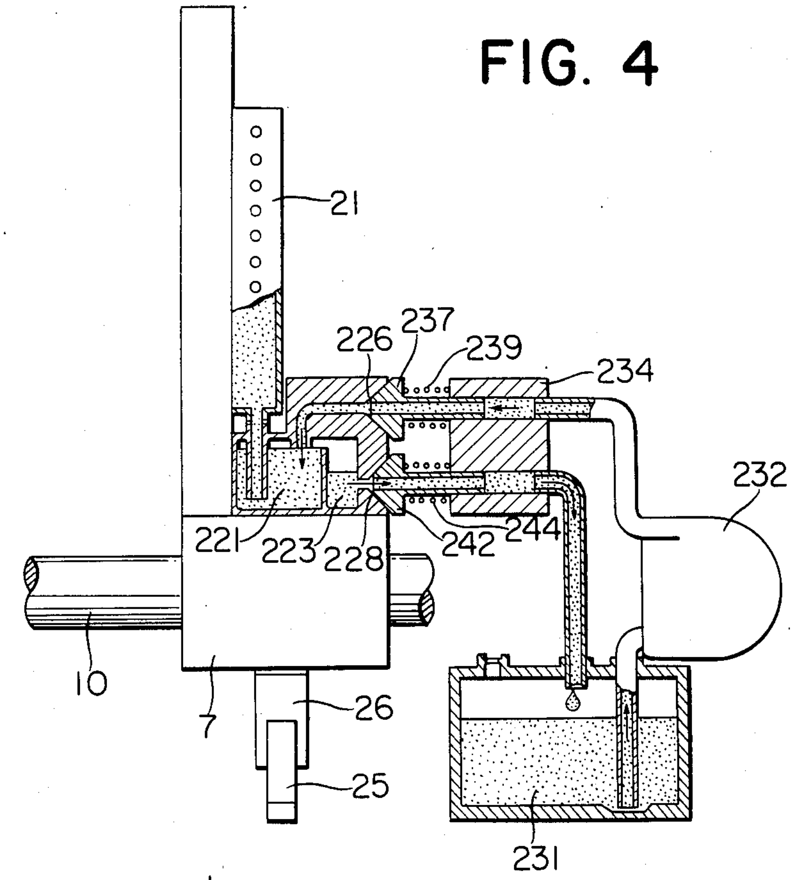
FIG. 4 is a partly enlarged sectional view showing the manner of ink supply and ink recovery between the main tank and the sub-tank.

To supply ink to the sub-tank from the main tank, the nozzles 237 and 242 on the ink supply part 23 are fitted into the corresponding concaved portions 226 and 228 formed on the side wall of the sub-tank 22. The fitting of nozzles 237, 242 in concaved portions 226, 228 is established when the carriage 7 is moved along the slide shaft 10 up to the end portion of the moving path near the stationary ink supply part 23. After fitting and a further movement of the carriage 7, the nozzles 237 and 242 are pressed against the corresponding concanved ports 226 and 228 by the springs respectively so that a tight fit can be obtained between the nozzle 237 and the concaved port 226 and between the nozzle 242 and the concaved port 228. Thus, as shown in FIG. 4, there are formed an ink supply path extending from the main tank 231 to the sub-tank 22 through the nozzle 237 and the ink supply port 226, and an ink withdrawal path extending from the overflow tank compartment 223 to the main tank 231 through the ink withdrawal port 228 and the nozzle 242. The position of the carriage 7 in which the above tight fit is attained completely, is detected by a sensor 25. By the detection output signal from the sensor 25 the carriage position is controlled. In the shown embodiment, the sensor 25 is formed of a photo coupler comprising a light-emitting diode and a photo transistor. A screen plate 26 is provided on the bottom 7B of the carriage 7. When the screen plate 26 is detected by the sensor 25, the carriage 7 is stopped. The detection output from the sensor 25 is used also to start an ink supply operation by the pump 232.

In the embodiment, the carriage 7 starts running toward the ink supply part 23 when an ink supply instruction is issued from an operation part not shown. When the carriage 7 enters the area of the sensor 25, the screen plate 26 on the bottom 7B of the carriage 7 is detected by the sensor 25. By means of the detection output from the sensor, the carriage is stopped at once. FIG. 4 shows the apparatus in this position. As described above, in this position the nozzle 237 is tightly fitted into the ink supply port 226 by the force of the spring 239. Similarly, the nozzle 242 is tightly fitted in the ink withdrawal port 228. In this position, there are formed an ink supply path extending from the main tank 231 to the sub-tank's compartment 221 through the nozzle 237 and the ink supply port 226 and an ink withdrawal path extending from the overflow compartment 223 to the main tank 231 through the ink withdrawal port 228 and the nozzle 242. At the time, in response to the detection output from the position sensor 25 the pump 232 is driven. In this manner, ink supply to the ink reservoir compartment 221 of the sub-tank from the main tank is started almost at the same time to the completion of the ink supply path and ink withdrawal path. Also, the ink in the overflow tank compartment is recovered into the main tank 231. An excess of supplied ink to the ink reservoir compartment 221 is flowed over the partition wall 222 into the overflow tank compartment 223. The ink overflowed out of the overflow tank compartment 223 is withdrawn into the main tank 231 through the port 228 and the nozzle 242.

The above operation of ink supply and ink withdrawal continue for a certain determined time. After that the ink supply instruction is cancelled and the carriage 7 is returned to the position determined for printing along the slide shaft 10. The printer starts printing. During the printing operation, ink is supplied to every ink jet nozzle of the head from the ink reservoir compartment 221 of the sub-tank through the liquid chamber 211 in the head 21. During the printing operation some amount of ink may be overflowed from the ink reservoir compartment 221 over the partition wall 222 by the movement of the carriage 7 or the change in running speed of the carriage, for example, at the stop of the carriage 7. The overflowed ink is received in the overflow tank compartment 223 and stored in it.

When the next ink supply instruction is issued, the above-described operation of ink supply and ink withdrawal is repeated.

Figure 5:
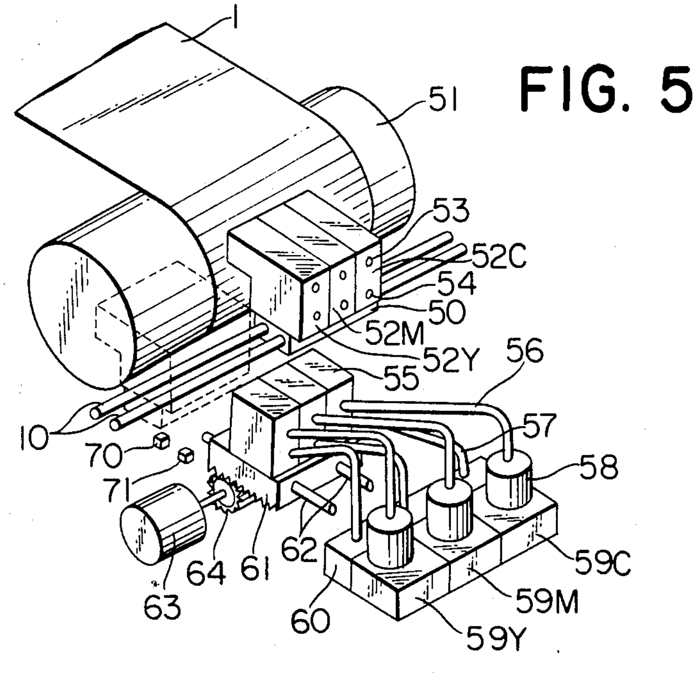
FIG. 5 is a perspective of a color printer showing a second embodiment of the invention.
Figure 6:
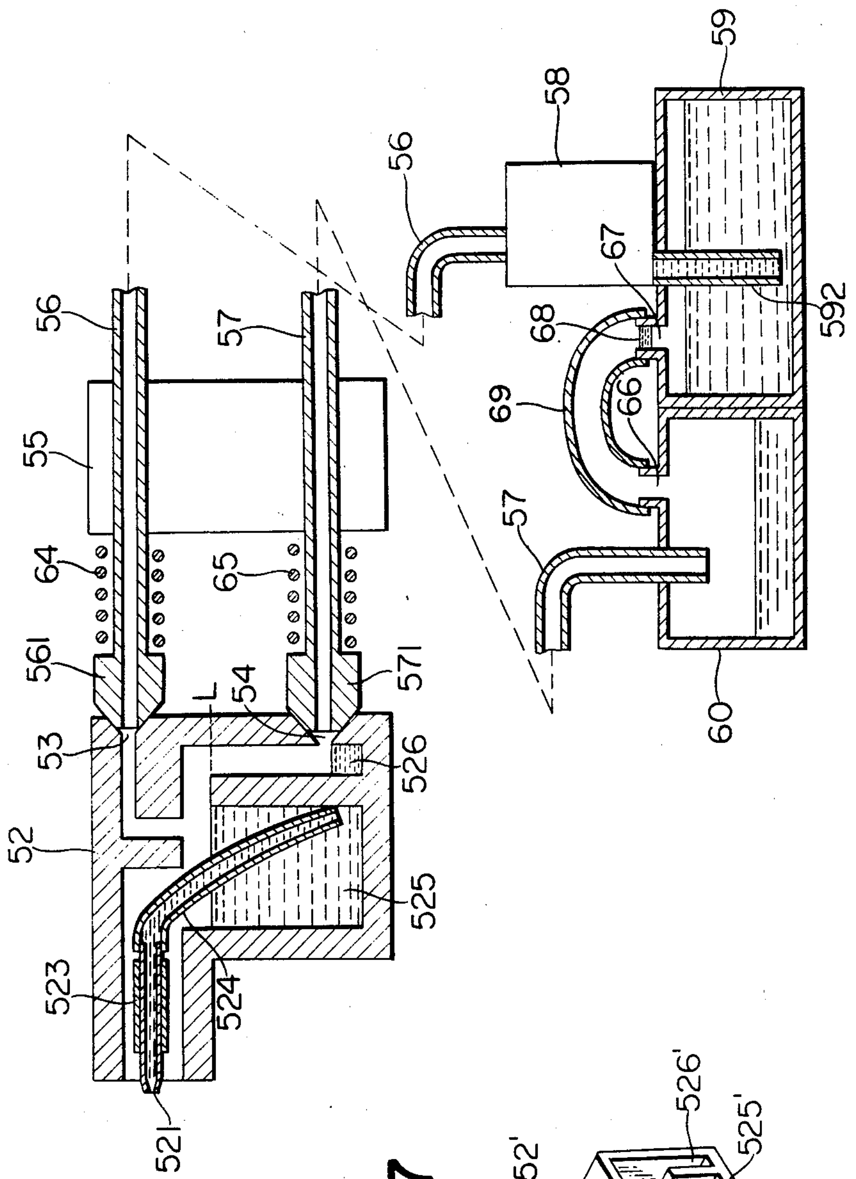
FIG. 6 is a sectional view thereof in the position for ink supply and ink exhaust.

FIGS. 5 and 6 show a second embodiment of the invention wherein the present invention has been applied to a color ink jet printer.

In FIG. 5, again 1 is a recording paper and 10 is a slide shaft for guiding the carriage 50. In this color ink jet printer the carriage 50 carries thereon three ink jet head units, namely cyan ink jet head unit 52C, magenta ink jet head unit 52M and yellow ink jet head unit 52Y. 51 is a platen of the printer. Each the head unit has an ink supply port 53 and an ink withdrawal port 54. 55 is a block for supporting an ink supply tube 56 and an ink withdrawal tube 57. 58 is a pump. As three different color inks are used, three supporting blocks 55 and three pumps 58 are provided in this case. Three different color inks arc stored in ink tanks 59C, 59M and 59Y respectively. Withdrawn inks are stored in exhaust ink tanks 60 respectively. Designated by 61 is a supporting rack for supporting and moving the blocks 55. The rack 61 is guided along slide rails 62. The rack is in engagement with a pinion 64 and driven by a motor 63 through the pinion. 70 is a sensor for detecting it that the head unit 52 is in home position. 71 is also a sensor for detecting it that the supporting block 55 is in the position for ink supply.

Since the three head units 52C, 52M and 52Y are all the same in construction and in fuction, a further detailed description will hereinafter be made in connection with only one of three colors with reference to FIG. 6.

FIG. 6 is a sectional view showing one of the three head units 52 and the ink supply and withdrawal system associated with the head unit 52.

In FIG. 6, 521 is an ink jet nozzle, 523 is a piezo-electric element for contracting the nozzles 521 to make ink jetted from the nozzle, and 524 is an ink tube through which the nozzle communicates with a sub-tank 525. 526 is an overflow tank. The ports 53 and 54 on the head unit are concaved into a cone-like shape. On the other hand, the ink tubes 56 and 57 supported by the block 55 have cone-shaped tip end portions 561 and 571 respectively. Springs 64 and 65 are disposed between the cone-shaped end portion 561 and the block 55 and between the cone-shaped end portion 571 and the block 55 to ensure tight fit of the cone-shaped end portions 561, 571 to the corresponding concaved ports 53, 54.

The exhaust ink tank 60 has an opening 66 and the main ink tank 59 has an opening 67 provided with a filter 68 to filter off foreign matters. The two openings 66 and 67 are in communication to each other through a tube 69.

The manner of operation of the second embodiment shown in FIGS. 5 and 6 is as follows:

Three head units 52C, 52M, 52Y are together mounted on the carriage 50 and are moved along the rails 10 to form a color image on the recording paper 1. When printing of a determined number of recording papers 1 has been completed, the carriage 50 is returned to the position suggested by a phantom line in FIG. 5. When the carriage reaches the position, it is detected by the sensor 70. In response to the detection output from the sensor, the motor 63 starts to rotate so as to move the supporting block 55 toward the head unit 52 through the rack 61 and pinion 64. The block 55 is moved to the position shown in FIG. 6. In this position, the cone-shaped tip end portions 561, 571 of the tubes 56, 57 engage in the corresponding ports 53, 54 of the head unit 52 and there is formed a tight fit between the tube ends 561, 571 and the ports 53, 54 by the action of springs 64, 65.

In the position shown in FIG. 6, the pump 58 is driven to supply ink from the main tank 59 to the sub-tank 525 through the supply tube 56 and port 53. The amount of ink supplied at this time is preset to a value at least equal to the capacity of the sub-tank 525. Therefore, the liquid level of the ink in the sub-tank 525 surely reaches the level L by one ink supply operation. An amount of ink corresponding to the amount of ink remained before the ink supply will overflow into the overflow tank 526.

As a result of the ink supply, the amount of the ink within the main tank 59 decreases as a matter of course. Consequently the air pressure in the main tank 59 drops down below the atmospheric pressure. Also, in the exhaust ink tank 60 which is in communication to the main ink tank 59 through the tube 69, the air pressure drops down accordingly. Therefore, the ink overflowed into the overflow ink tank 526 at the ink supply flows into the exhaust ink tank 60 by the existing pressure difference. This second embodiment has the following advantages:

In the second embodiment an exhaust ink tank 60 is provided. Therefore, the ink once supplied to the subtank is never fed to the sub-tank again for reuse. This has an effect to prevent the ink from being contaminated by foreign matters.

The exhaust ink tank 60 is in communication to the main tank 59 through a tube 69. Therefore, the overflowed ink can be exhaused into the exhaust ink tank without the need of pump.

Figure 7:
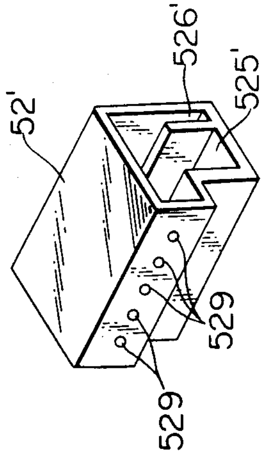
FIG. 7 is a partly sectional view of another recording unit.

FIG. 7 is a partly broken-away perspective view of a head unit 52' showing a further embodiment of the invention.

In FIG. 7, the portions designated by 529 correspond to the forward end portion of the nozzle 521 shown in FIG. 6. 525' is a sub-tank and 526' is an overflow tank. The sub-tank and the overflow tank are common to all of the ink jet nozzles. In this embodiment the nozzles are horizontally aligned. In other words, the nozzles are arranged in a row in the direction parallel to the ground. This arrangement of nozzles is different from that of the above-described first embodiment where the nozzles have been vertically aligned. The horizontal arrangement of nozzles has an advantage. Since the nozzles are arranged in a row parallel to the ground or to the slide shaft for guiding the carriage, the pressure difference from the liquid level of ink within the subtank to the nozzle end 529 is constant for all of the nozzles. This eliminates variation in speed and amount of the ink jetted from the nozzles.

Figure 8:
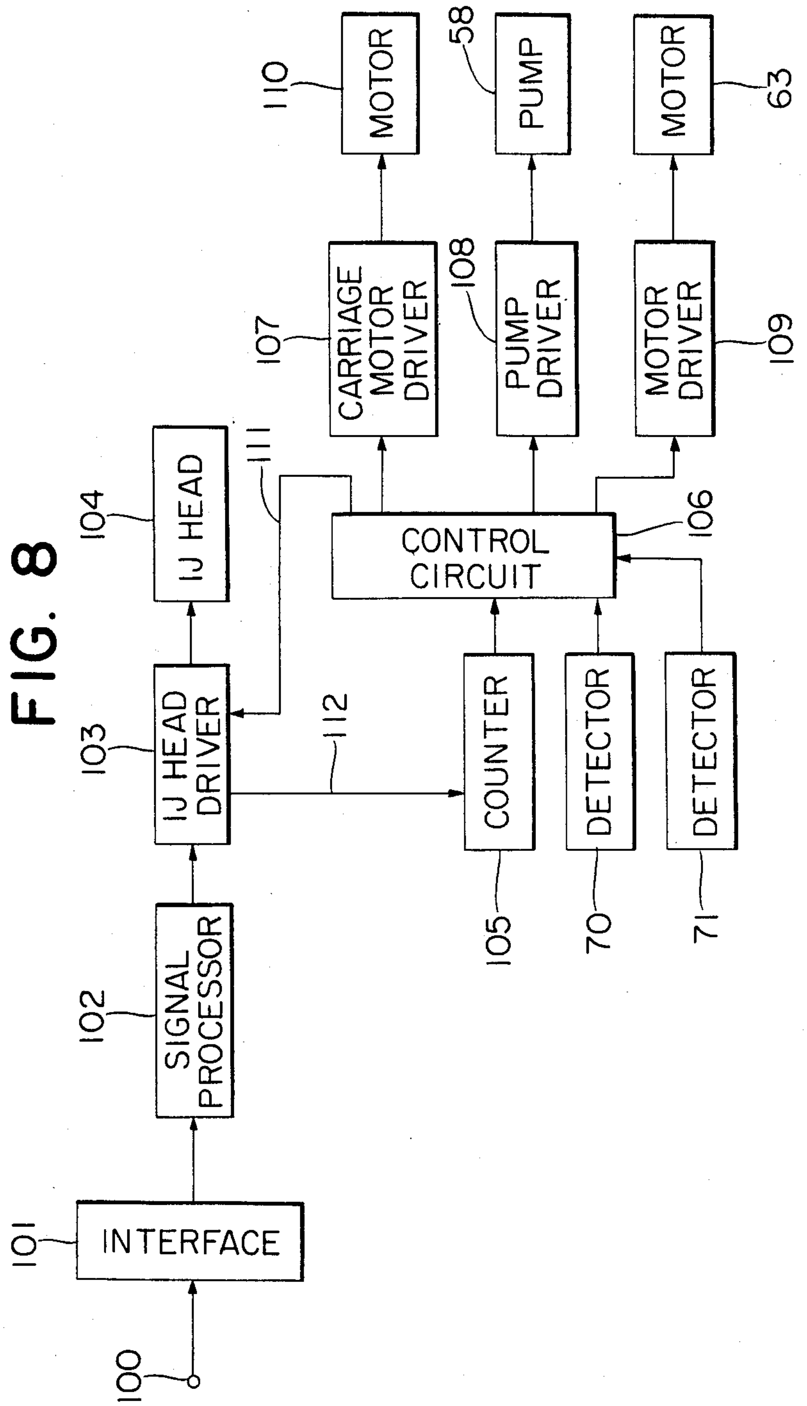
FIG. 8 is a block diagram of a printer driving circuit of the second embodiment.

FIG. 8 shows the control circuit of the printer according to the previously described second embodiment.

Figure 9:
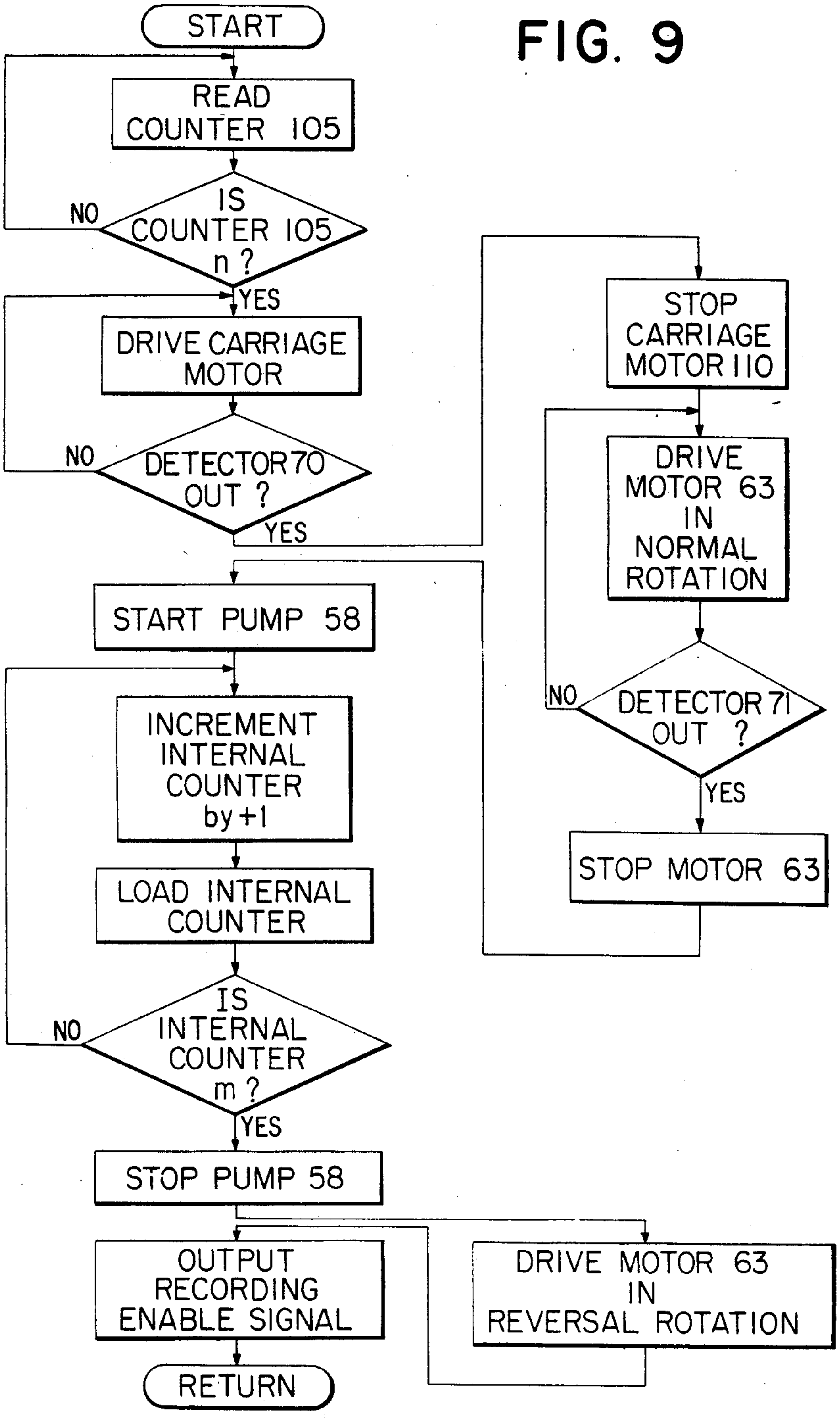
FIG. 9 is a flow chart of the control circuit shown in FIG. 8.

In FIG. 8, 100 is an image signal input terminal, 101 is an image signal interface and 102 is a known signal processor for converting the image signal into an ink jet head driving signal. 103 is a known ink jet head driver, 104 is an ink jet head corresponding to the head 52 shown in FIG. 5, and 105 is a counter for counting the number of printed sheets by means of print end signal 112. 70 and 71 are position detectors as shown in FIG. 5. 107 is a carriage motor driver for driving a carriage motor 110 not shown in FIG. 5. 108 is a pump driver, 109 is a motor driver for driving the motor 63 and 111 is a signal line for outputting a recording enable signal at the completion of ink supply. 106 is a control circuit for controlling the ink supply. The control circuit 106 is composed of a micro-computer comprising CPU, ROM and RAM and operates following the flow chart shown in FIG. 9.

Operations for driving the ink jet head are wellknown to those skilled in the art and therefore need not be further described. Hereinafter the ink supply operation will be described with reference to the flow chart shown in FIG. 9.

When the content of the counter 105, that is, the number of printed sheets reaches n, the carriage motor 110 is driven to return the carriage 50 to its home position. The arrival of the carriage at the home position is detected by the detector 70. By a detection signal of the detector the carriage motor 110 is stopped. Then, the motor 63 is driven into foward rotation to move the supporting block 55 from the retracted position to the position for ink supply. When the block 55 reaches the position for ink supply, it is detected by the detector 71 and the motor 63 is stopped. At the same time, the pump 58 is driven. Ink is supplied to the sub-tank 525 and the overflowed ink is exhausted into the exhaust ink tank 60. The pump driving time is counted by a counter within the controller 106. A determined time thereafter, driving of the pump 58 is stopped. As previously noted, the determined time for pump driving is sufficiently long enough to supply an amount of ink corresponding to the capacity of the sub-tank 525. Upon the completion of the ink supply, the motor 63 is driven in reversal rotation to move the supporting block 55 back to the retracted position. At the time, the controller issues a recording enable signal to the ink jet head driver 103.

As readily understood from the foregoing, the ink supply system according to the invention has many advantages over the prior art.

According to the invention, the liquid level of supplied ink within the sub-tank can be maintained at a constant level, which makes it possible to keep constant the supply pressure of ink supplied to every recording element from the sub-tank. Therefore, high quality images are always formed on the recording paper.

Furthermore, according to the invention an ink exhaust path is provided to exhaust the ink overflowed from the sub-tank by ink supply. Therefore, the exhaust of the ink can be carried out in a very simple manner. It is no longer necessary for the operator to do the exhaust of the ink. In addition, it is no longer necessary to control the amount of supplied ink. By supplying ink in an amount above a determined value, the liquid level in the sub-tank becomes automatically constant. Therefore, there is no need of providing a level detector or the like within the sub-tank.

While the invention has been particularly shown and described with reference to preferred embodiments thereof, it is to be understood that the invention is not limited thereto but may be otherwise variously embodied within the scope of the invention.

For example, in the above embodiments the main ink tank has been located in the vicinity of the end of the carriage running path and the sensor has been arranged to start ink supply and withdrawal when the carriage reaches the end of the running path. However, timing for ink supply and withdrawal may be selected otherwise providing that the ink supply and withdrawal be carried out not continuously but intermittently. The timing for ink supply and withdrawal may be determined, for example, by the amount of ink within in the main tank. In this case, a sensor is provided to detect the amount of ink and the operation for ink supply and recovery is started in response to the detection output from the sensor. As another example, an instruction for ink supply and withdrawal may be given after a determined number of arrivals of the carriage at the running end.

The present invention is applicable to other recording apparatus than the ink jet recording apparatus particularly shown in the above embodiments providing that the apparatus uses any recording liquid. For example, the present invention is applicable also to a pen recorder.

What is claimed is:

1. A recording apparatus for recording using recording liquid, the apparatus comprising:

a recording element for recording on a recording medium using the recording liquid;

a first tank for storing recording liquid to be supplied to said recording element;

a movable carriage carrying said recording element and said first tank for movement relative to the recording medium;

a second tank for storing recording liquid to be supplied to said first tank, said second tank being stationary relative to said carriage;

supply means for intermittently forming a supply path for recording liquid from said second tank to said first tank; and overflow means for maintaining the level of the recording liquid in said first tank at a predetermined level, said overflow means including an overflow tank carried by said carriage and separated from said first tank by a wall.

2. A recording apparatus as set forth in claim 1, wherein said overflow means includes an exhaust path for exhausting recording liquid from said overflow tank.

3. A recording apparatus as set forth in claim 2, wherein said exhaust path communicates with said second tank, whereby exhausted recording liquid can be resupplied to said first tank.

4. A recording apparatus as set forth in claim 2, further comprising a third tank communicating with said exhaust path for storing recording liquid exhausted from said overflow tank.

5. A recording apparatus as set forth in claim 2, wherein said exhaust path is formed substantially simultaneously with the formation of said supply path by said supply means.

6. A recording apparatus as set forth in claim 1, further comprising pump means for forceably supplying recording liquid from said second tank to said first tank after said supply means has formed said supply path.

7. A recording apparatus as set forth in claim 6, wherein said pump means supplies the recording liquid in an amount sufficient enough to make recording liquid in said first tank overflow from said first tank over said wall into said overflow tank.

8. A recording apparatus as set forth in claim 1, wherein said overflow means includes an exhaust port through which recording liquid stored in said overflow tank can be exhausted.

9. A recording apparatus as set forth in claim 1, wherein said recording element comprises a recording head for jetting the recording liquid to perform recording.

10. A recording apparatus as set forth in claim 1, wherein said supply means forms said supply path after a determined number of sheets of the recording medium have been recorded on.

11. A recording apparatus as set forth in claim 1, wherein recording liquid in excess of the capacity of said first tank overflows from said first tank over said wall into said overflow tank.

12. A recording apparatus for recording using recording liquid, the apparatus comprising:

a recording unit having a recording element for printing on a recording medium using the recording liquid, a first tank for storing recording liquid to be supplied to said recording element, an input port through which recording liquid can be supplied to said first tank, an overflow tank separated from said first tank by a wall for maintaining the level of the recording liquid in said first tank at a predetermined level and an exhaust port for exhausting recording liquid that has overflowed from said first tank into said overflow tank;

a movable carriage carrying said recording unit for movement relative to the recording medium;

a second tank for storing recording liquid to be supplied to said first tank, said second tank being stationary relative to said carriage; and supply means for intermittently forming a supply path for recording liquid from said second tank to said input port.

13. A recording apparatus as set forth in claim 12, wherein said input port and said exhaust port are formed on the same surface of said recording unit.

14. A recording apparatus as set forth in claim 12, further comprising means for forming an exhaust path for recording liquid in said overflow tank.

15. A recording apparatus as set forth in claim 14, wherein said supply path and said exhaust path are formed substantially simultaneously.

16. A recording apparatus as set forth in claim 15, further comprising flow means for forceably supplying recording liquid from said second tank to said first tank after said supply path and said exhaust path have been formed.

17. A recording apparatus as set forth in claim 16, wherein said flow means comprises a pump.

18. A recording apparatus as set forth in claim 17, wherein said pump is driven for a determined period of time to supply to said first tank a determined amount of the recording liquid.

19. A recording apparatus as set forth in claim 18, wherein said determined amount is equal to the capacity of said first tank.

20. A recording apparatus as set forth in claim 14, wherein said exhaust port and said second tank communicate through said exhaust path.

21. A recording apparatus as set forth in claim 14, further comprising a third tank communicating with said exhaust path for storing recording liquid exhausted through said exhaust port.

22. A recording apparatus as set forth in claim 21 further comprising equalization means for substantially equalizing the pressure in said third tank and the pressure in said second tank.

23. A recording apparatus as set forth in claim 22, wherein said equalization means comprises a pipe through which said second and third tanks communicate.

24. A recording apparatus as set forth in claim 12, wherein said recording element comprises a recording head for jetting the recording liquid to perform recording.

25. A recording apparatus as set forth in claim 12, wherein said recording unit comprises a plural number of recording elements.

26. A recording apparatus as set forth in claim 25, wherein said recording elements are horizontally arranged in a row.

27. A recording apparatus as set forth in claim 12, wherein recording liquid in excess of the capacity of said first tank overflows from said first tank over said wall into said overflow tank.

* * * * *

UNITED STATES PATENT AND TRADEMARK OFFICE

CERTIFICATE OF CORRECTION

PATENT NO. : 4,677,448

DATED : June 30, 1987

INVENTOR(S) : NOBUTOSHI MIZUSAWA, ET AL.

It is certified that error appears in the above-identified patent and that said Letters Patent is hereby corrected as shown below:

AT [73] UNDER THE ASSIGNEE

Line 1, "Canon Kabushiiki Kaisha," should read --Canon Kabushiki Kaisha,--.

COLUMN 1

Line 42, "driven running" should read --driven--.
Line 51, "abovedescribed" should read --above-described--.

COLUMN 4

Line 57, "concanved" should read --concaved--.

COLUMN 5

Line 66, "Each the" should read --Each---.

COLUMN 6

Line 4, "arc" should read --are--.
Line 10, "it" should be deleted.
Line 12, "it" should be deleted.

COLUMN 7

Line 19, "exhaused" should read --exhausted--.

UNITED STATES PATENT AND TRADEMARK OFFICE
CERTIFICATE OF CORRECTION

PATENT NO. : 4,677,448

DATED : June 30, 1987

INVENTOR(S) : NOBUTOSHI MIZUSAWA, ET AL.

It is certified that error appears in the above-identified patent and that said Letters Patent is hereby corrected as shown below:

COLUMN 8

Line 19, "At the time," should read --At that time,--.
Line 55, "within in" should read --within--.

Signed and Sealed this

Seventeenth Day of November, 1987

*Attest:*

DONALD J. QUIGG

*Attesting Officer*

*Commissioner of Patents and Trademarks*